(12) United States Patent
Olson et al.

(10) Patent No.: US 8,522,821 B2
(45) Date of Patent: Sep. 3, 2013

(54) TORQUE MOTOR LINEARIZATION

(75) Inventors: Ronald D. Olson, Mission Hills, CA (US); Torin R. Lewis, Van Nuys, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 531 days.

(21) Appl. No.: 12/884,847

(22) Filed: Sep. 17, 2010

(65) Prior Publication Data

US 2012/0068095 A1     Mar. 22, 2012

(51) Int. Cl.
*F15B 13/043*     (2006.01)

(52) U.S. Cl.
USPC ............ 137/625.62; 137/625.64; 251/129.01; 251/298; 335/281

(58) Field of Classification Search
USPC .................. 137/625.61–625.64; 251/129.01, 251/129.15, 298; 335/281; 310/216.097
See application file for complete search history.

(56) References Cited

U.S. PATENT DOCUMENTS

| | | | | |
|---|---|---|---|---|
| 3,029,830 | A * | 4/1962 | Klover et al. ............ | 137/625.62 |
| 3,399,861 | A * | 9/1968 | Howland ................. | 137/625.62 |
| 3,532,121 | A * | 10/1970 | Sciortino et al. ........... | 137/625.4 |
| 3,570,807 | A * | 3/1971 | Sturman et al. .......... | 251/129.17 |
| 3,910,314 | A * | 10/1975 | Nicholson ................ | 137/625.62 |
| 4,120,481 | A * | 10/1978 | VON Koch .............. | 251/129.17 |
| 4,362,182 | A * | 12/1982 | Sjolund ..................... | 137/625.64 |
| 5,772,181 | A * | 6/1998 | Robertson, III ............... | 251/285 |
| 6,116,571 | A * | 9/2000 | Hettinger ................. | 251/129.18 |
| 7,093,607 | B2 | 8/2006 | Rodriguez et al. | |
| 7,137,613 | B2 * | 11/2006 | Jansen ........................ | 251/298 |
| 7,210,500 | B2 | 5/2007 | Achmad et al. | |
| 7,290,565 | B2 | 11/2007 | Achmad | |
| 7,458,394 | B2 | 12/2008 | Achmad | |

\* cited by examiner

*Primary Examiner* — John Bastianelli
(74) *Attorney, Agent, or Firm* — BainwoodHuang

(57) ABSTRACT

A servovalve torque motor includes first and second pole pieces and an armature. Each of the first and second pole pieces includes an armature face that opposes the armature. The area of the armature face of the second pole piece is smaller than the area of the armature face of the first pole piece. The unequal areas of the first and second armature faces create a bias in the servovalve torque motor while allowing the first and second pole pieces to be disposed at equal distances from the armature to define substantially equal air gaps. The inclusion of substantially equal air gaps between the pole pieces and the armature reduces the maximum flux in the armature for the same bias and torque output, compared to conventional servovalve torque motors. The reduction in maximum armature flux decreases armature saturation and improves linearity during operation.

17 Claims, 8 Drawing Sheets

TORQUE MOTOR LINEARIZATION

BACKGROUND

Conventional servovalves convert relatively low power electrical control input signals into a flow rate or control pressure. For example, during operation pressurized fluid enters the direct drive servovalve and, based upon the control input signals, drives a fluid actuator to operate variable-geometry elements such as associated with an aircraft.

A typical servovalve includes a housing, a valve member such as a spool, and a torque motor. The housing defines a fluid pathway with the valve member being disposed within the fluid pathway. The torque motor is configured to either cause the valve member to move within the fluid pathway in order to control an amount of fluid flow within the pathway or to control a fluid pressure within the fluid pathway.

During operation, a user activates a user input device that generates and delivers a command signal to the servovalve. The torque motor receives the command signal and converts the signal to an output torque where the torque is proportional in magnitude to the command signal. In the case where the servovalve is configured as a direct drive servovalve, the torque motor moves the valve member to a desired position within the fluid pathway to control an amount of fluid flow relative to the fluid actuator. In the case where the servovalve is configured as an electro-hydraulic servovalve, such as a dual nozzle/flapper servovalve, the torque motor positions a flapper relative to a nozzle to adjust a fluid pressure within the housing, which, in turn moves the valve member to a desired position within the fluid pathway

SUMMARY

Conventional servovalve torque motors are configured to operate at a particular rated current in order to provide a desired torque motor output. For example, FIG. 1 is a graph 10 of torque motor output versus input current (e.g., rated input current) for a typical permanent magnet torque motor. As illustrated, the graph 10 includes a linear region 12 where an increase or decrease in the input current provided to the torque motor results in the motor generating a corresponding, directly proportional torque output. Also as illustrated, the graph 10 includes saturation regions 14, 16 where an increase or decrease in the input current provided to the torque motor results in the torque motor generating a corresponding nonlinear torque output.

With reference to FIG. 1, certain servovalve torque motors are optimized for symmetric operation at a designed rated current (0 milliamps±rated current) and operate in the linear region 12 of the curve 10. However, other conventional servovalve torque motors have a biased input current (X milliamps±rated current). For example, pressure control servovalves, such as dual nozzle/flapper servovalves, operate with a 100% biased motor or within a current range between 0 milliamps and the rated current. Such biasing of the input current causes the torque motor and a valve or spool associated with the servovalve to assume a null position at the start of operation. In order to bias the input current, manufacturers conventionally adjust the spacing or air gaps between two magnetic pole pieces associated with the torque motor and the armature of the torque motor, as the size of the air gaps between the magnetic pole pieces and the armature affects the gain of the motor. For example, with reference to a conventional servovalve torque motor 20, as illustrated in FIG. 2, manufacturers typically position magnetic pole pieces 22, 24, relative to an armature such that the resulting air gaps 28, 30 between each of the pole pieces 22, 24 and the armature 26 are unequal (i.e., the armature 26 will rotate toward the pole piece 22 as a result of the flux path through the pole pieces 22, 24). Such positioning results in greater armature flux at a particular rated current. However, because these torque motors operate with 100% bias, the motors are more susceptible to saturation. Accordingly, such positioning of the pole pieces 22, 24 can affect operation of the servovalve when the rated input current enters the saturation region 14, 16 of the curve 10, as shown in FIG. 1.

For example, FIG. 3 illustrates a pressure-gain plot 30 for a conventional torque motor of a servovalve. During the manufacturing process, a manufacturer calibrates the torque motor, such as by adjusting the positioning of the pole pieces relative to the armature. By calibrating the torque motor, the manufacturer adjusts a pressure-gain relationship 36 of the servovalve such that the gain of the torque motor and the corresponding pressure output of the servovalve falls within a range between an upper boundary 32 and a lower boundary 34. However, in the case where the torque motor has a biased input current, such as created by unequal air gaps between the pole pieces and the armature of the torque motor, while the pressure-gain relationship 36 for the servovalve falls within the boundaries 32, 34, saturation or nonlinear output is evident at a maximum portion 38 of the pressure-gain plot 30. At the maximum portion 38, the measured pressure-gain relationship 36 deviates from an expected pressure-gain relationship 40. Accordingly, during operation of the torque motor, application of a saturation current (e.g., between 30-35 milliamps) can result in a non-linear (e.g., non-directly proportional) pressure output by the servovalve.

Embodiments of the present invention relate to torque motor linearization. A servovalve torque motor, such as a double nozzle/flapper torque motor, is configured with a biased input current. To bias the current, the servovalve torque motor includes first and second pole pieces that oppose an armature of the torque motor. Each of the first and second pole pieces includes an armature face that opposes the armature. However, the area of the armature face of the second pole piece is smaller than the area of the armature face of the first pole piece. With this configuration, the unequal areas of the first and second armature faces create a bias in the servovalve torque motor while allowing the first and second pole pieces to be disposed at equal distances from the armature to define substantially equal air gaps. The inclusion of substantially equal air gaps between the pole pieces and the armature reduces the maximum flux in the armature for the same bias and torque output, compared to conventional servovalve torque motors. The reduction in maximum armature flux decreases armature saturation and improves linearity during operation.

In one arrangement, a torque motor, such as a double nozzle/flapper torque motor, includes a frame having an armature pivotably coupled thereto and a coil carried by the frame, the coil disposed at least partially about the armature. The torque motor includes a first pole piece carried by the frame. The first pole piece is disposed in proximity to a first coil portion. The first pole piece has a first armature face that opposes a first armature portion, the first armature face defining a first pole piece area. The torque motor includes a second pole piece carried by the frame. The second pole piece opposes the first pole piece and is disposed in proximity to a second coil portion, the second coil portion opposing the first coil portion. The second pole piece has a second armature face that opposes a second armature portion, the second armature face defining a second pole piece area, the second pole piece area being less than the first pole piece area of the first pole piece.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to torque motor linearization. A servovalve torque motor, such as a double nozzle/flapper torque motor, is configured with a biased input current. To bias the current, the servovalve torque motor includes first and second pole pieces that oppose an armature of the torque motor. Each of the first and second pole pieces includes an armature face that opposes the armature. However, the area of the armature face of the second pole piece is smaller than the area of the armature face of the first pole piece. With this configuration, the unequal areas of the first and second armature faces create a bias in the servovalve torque motor while allowing the first and second pole pieces to be disposed at equal distances from the armature to define substantially equal air gaps. The inclusion of substantially equal air gaps between the pole pieces and the armature reduces the maximum flux in the armature for the same bias and torque output, compared to conventional servovalve torque motors. The reduction in maximum armature flux decreases armature saturation and improves linearity during operation.

Figure 4:
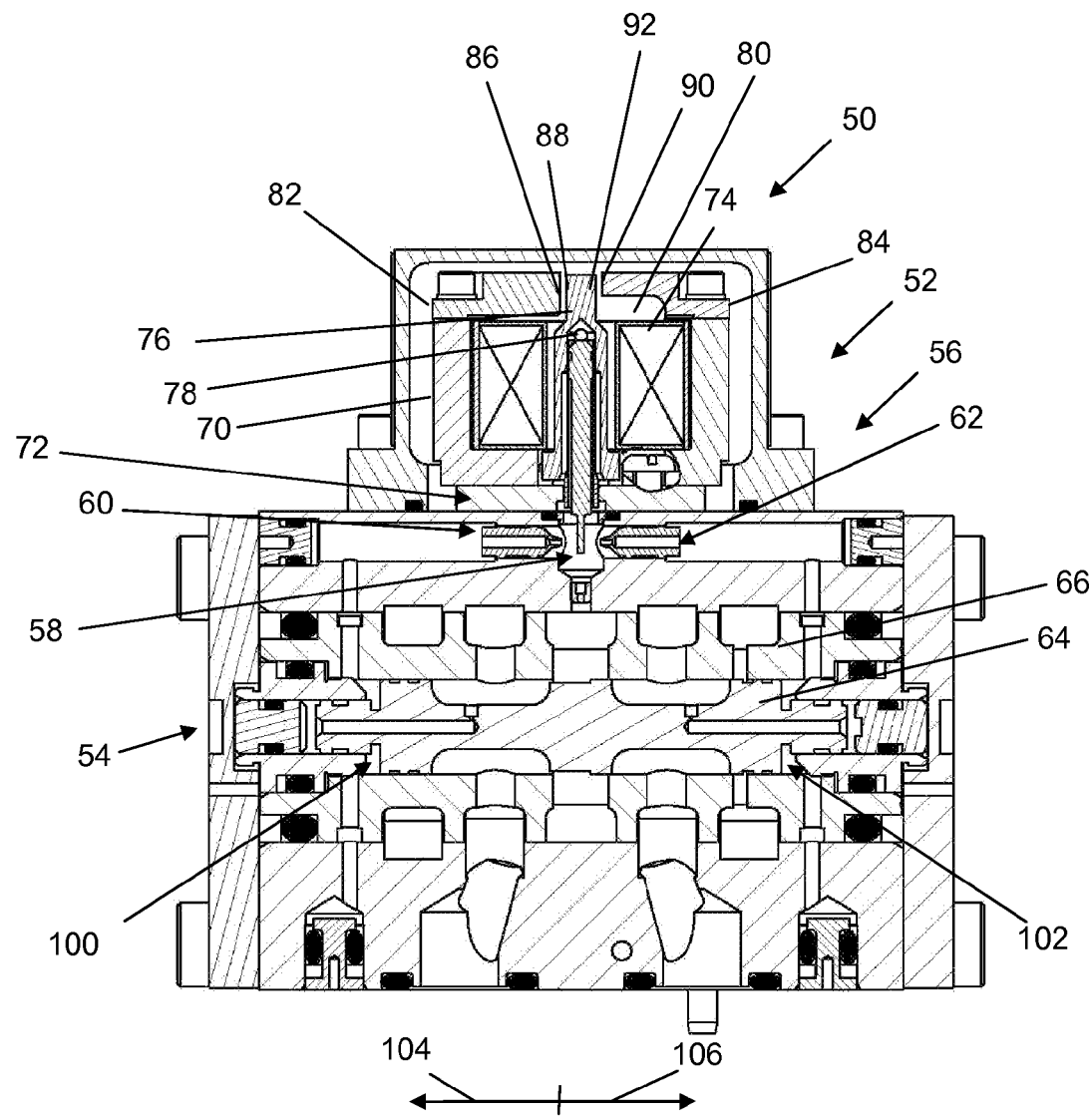
FIG. 4 is a sectional view of a schematic representation of a servovalve, such as a nozzle/flapper servovalve, according to one embodiment.

FIG. 4 illustrates a sectional view of a schematic representation of a servovalve 50, such as a nozzle/flapper servovalve. The servovalve 50 includes a first stage 52 and a second stage 54.

The first stage 52 of the servovalve 50 includes a torque motor 56, a flapper 58 carried by an armature 76 of the torque motor 56, and a set of nozzles 60, 62, such as jet nozzles, each of which are disposed in opposition to the flapper 58 and which are configured to deliver a fluid from a pressurized source (not shown) to the flapper 58. The torque motor 56 includes a stator formed of a frame 70 having a base magnet assembly 72 and a coil 74 carried by the magnet assembly. The armature 76 of the torque motor 56 rotatably couples to the frame 70 by a torsional spring pivot 78 and is disposed in electrical communication with the coil 74. For example, the armature 76 is formed of a magnetic material and disposed within an opening or air gap 80 defined by the coil 74.

The servovalve 50 further includes a first pole piece 82 and a second pole piece 84 disposed in electrical communication with the coil 74. For example, one of the pole pieces, such as the first pole piece 82 is disposed in proximity to a first portion of the coil 74 and permanently polarized "north" by the base magnet assembly 72. The remaining pole piece, such as the second pole piece 84, is disposed in proximity to a second portion of the coil 74 (e.g., opposing the first portion of the coil) and permanently polarized "south" by the base magnet assembly 72. The first and second pole pieces 82, 84 are also disposed in electrical communication with the armature 76. For example, the first pole piece 82 has a first armature face 86 that opposes a first armature portion 88 and the second pole piece 84 has a second armature face 90 that opposes a second armature portion 92. As will be described below, the first and second pole pieces 82, 84 are positionable relative to the first and second armature portions 88, 92, respectively, and are configured to provide bias input to the torque motor 52 while maintaining linearity of the torque motor 52 during operation.

The second stage 54 of the servovalve 50 includes a valve member or spool 64 carried by a sleeve 66 where the spool 64 is disposed in fluid communication with the nozzles 60, 62 and the flapper 58 of the first stage 52 of the servovalve 50. Positioning of the spool 64 within the sleeve 66, via the first stage 52 is configured to control the brake pressure of an antiskid control assembly or system, in one arrangement.

For example, during operation, the torque motor 56 receives a control signal input and transmits the control signal to the coils 74. In response to the control signal flowing through the coils 74, the coils 74 polarize the opposing ends of the armature 76 that, in turn, generates a torque on the armature 76 about the torsional spring pivot 78. As the armature 76 rotates about the torsional spring pivot 78, the armature 76 adjusts a position of the flapper 58 relative to the first and second nozzles 60, 62. For example, rotation of the armature 76 can cause the flapper 58 to impinge either the first nozzle 60 or the second nozzle 62. By impinging either the first nozzle 60 or the second nozzle 62, the flapper 58 causes an increase in fluid pressure from a pressurized fluid source (not shown) in either a first chamber 100 or a second chamber 102, respectively, as defined by the sleeve 66 and oriented at opposing ends of the spool 64. The increase in fluid pressure causes the spool 64 to translate within the sleeve 66 and meter an amount of fluid flowing between the pressurized fluid source and a fluid motor (not shown), thereby controlling positioning or movement of a load coupled to the fluid motor. For example, assume the flapper 58 positions along a −X direction 104. As a result, the first chamber 100 experiences an increase in fluid pressure which pushes the spool 64 along a +X direction 106, allowing pressurized fluid from the source pressurized fluid to control the brake pressure of an antiskid control assembly or system, in one arrangement.

As indicated above, the first and second pole pieces 82, 84 are configured to provide a bias to the input signal or current delivered to the coil of the torque motor 52 while maintaining linearity of the torque motor 52 during operation. Biasing of the input current via the pole pieces 82, 84 causes the torque motor 52 and the spool 64 associated with the servovalve 50 to assume a null or centered position within the servovalve housing at the start of operation. In order to maintain the linearity of the torque motor 52 with such an input bias, the first and second pole pieces 82, 84 are configured with unequal armature faces 86, 90, described in detail below.

Figure 5:
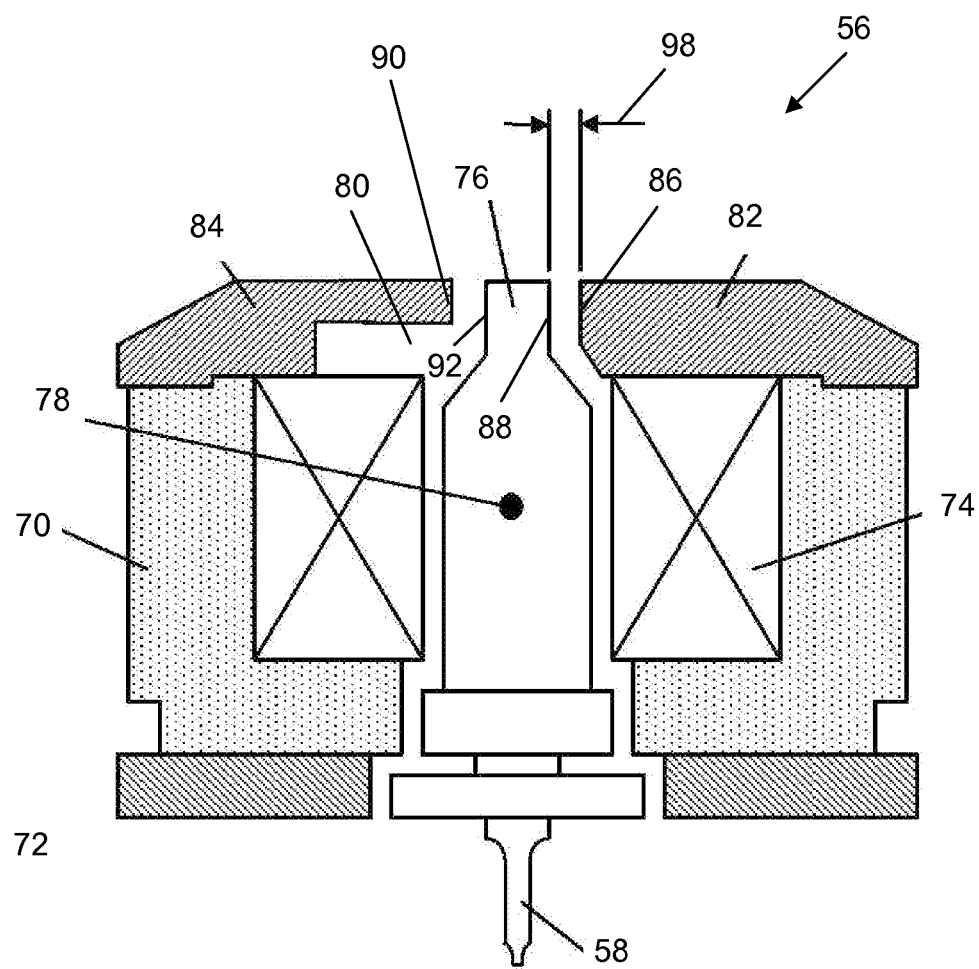
FIG. 5 illustrates a sectional view of a schematic representation of a torque motor as illustrated in FIG. 4, according to one embodiment.
Figure 7:
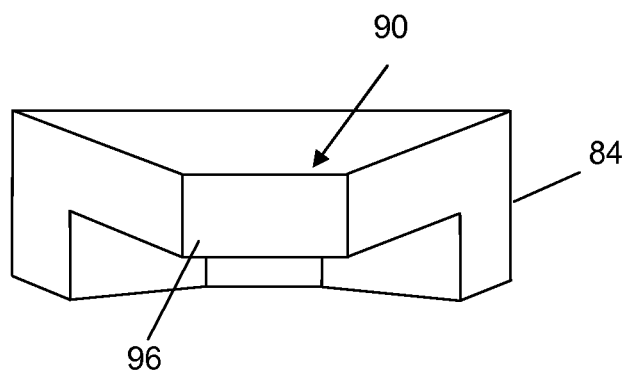
FIG. 7 is an armature end view of a second pole piece of the torque motor of FIG. 5, according to one embodiment.
Figure 6:
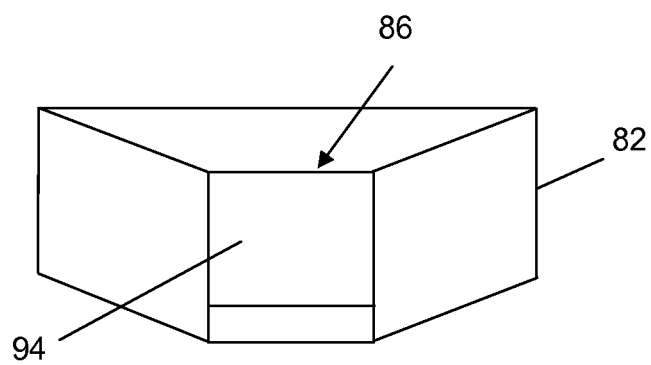
FIG. 6 is an armature end view of a first pole piece of the torque motor of FIG. 5, according to one embodiment.

As illustrated in FIGS. 5-7, the second pole piece 84 defines a second armature face 90 that is smaller in area relative to the area of first armature face 86 of the first pole piece 82. For example, in one arrangement, the area of the second armature face 90 is between about 40% and 50% less than the area of the first armature face 86. In another arrangement, the area of the second armature face 90 is 44% less than the area of the first armature face 86. With the reduction in the area of the second armature face 90 relative to the first armature face, such a reduction, in turn, reduces an amount of flux generated in the armature 76 by the second pole piece 84, relative to conventional pole pieces.

In one arrangement, a first pole piece area, 94 defined by the first armature face 86, is configured to generate a first bias armature flux in the armature 76 and a second pole piece area 96 defined by the second armature face 90 is configured to generate a second bias armature flux in the armature 76, the second bias armature flux being less than the first bias armature flux. For example, for a conventional pole piece, such as the first pole piece 82, the bias armature flux generated in the armature 76 is about $2.044*10^{-6}$ webers. By contrast, for a pole piece having a reduced armature face area, such as the second pole piece 84, the bias armature flux generated in the armature 76 is about $-2.185*10^{-6}$ webers. Accordingly, in one arrangement, the second pole piece area 96 defined by the second armature face 90 is configured to generate the second bias armature flux in the armature 76 between about 190% and 210% less than the first bias armature flux in the armature 76, as generated by the first pole piece area 94 defined by the first armature face 86. In another arrangement, the second pole piece area 96 defined by the second armature face 90 is configured to generate the second bias armature flux in the armature 76 of about 200% less than the first bias armature flux in the armature 76 as generated by the first pole piece area 94 defined by the first armature face 86.

Figure 1:
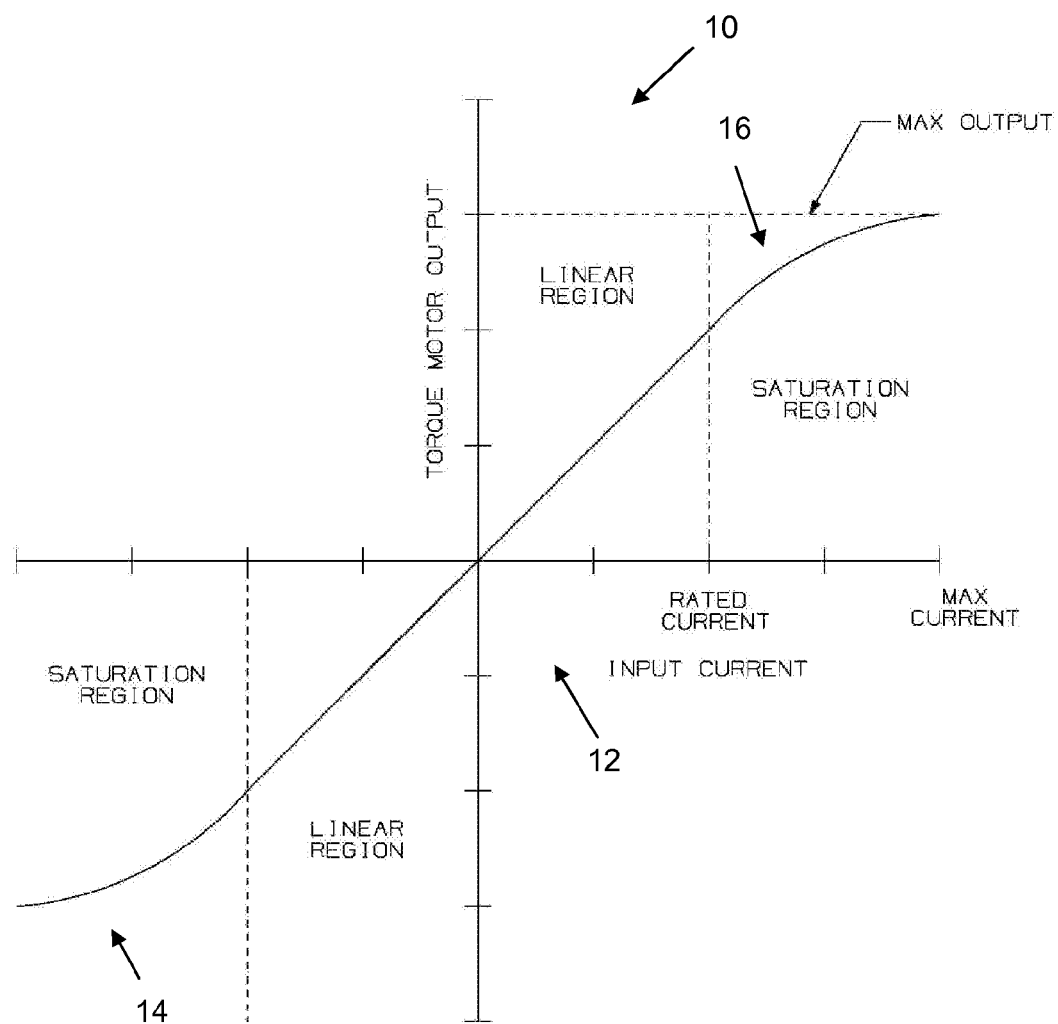
FIG. 1 is a graph of torque motor output versus input current for a conventional permanent magnet torque motor.
Figure 2:
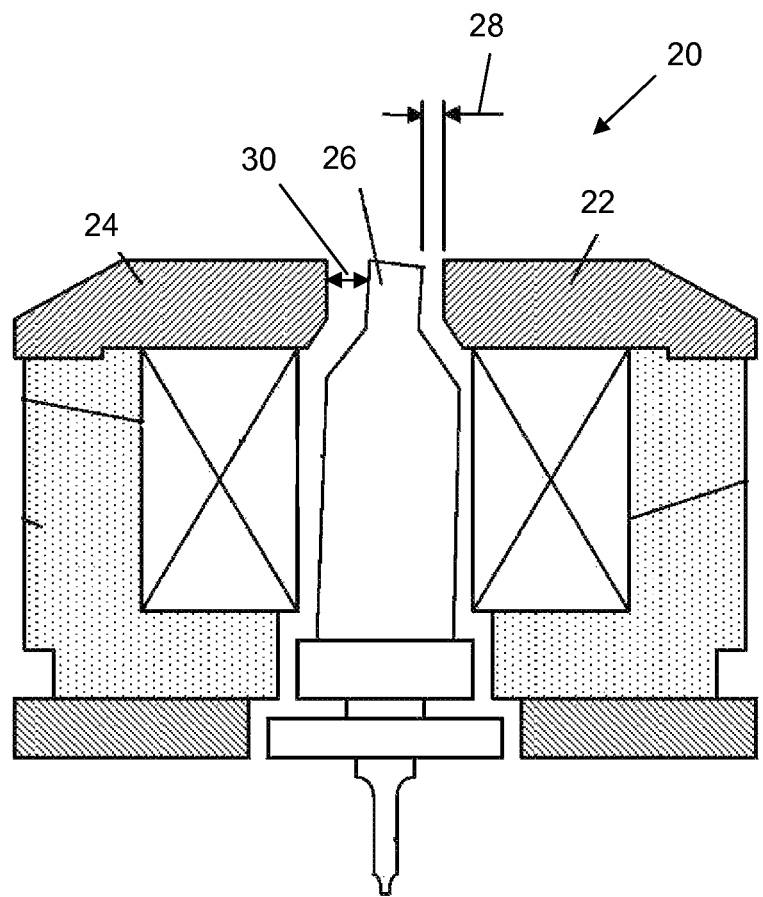
FIG. 2 illustrates a conventional servovalve torque motor.
Figure 3:
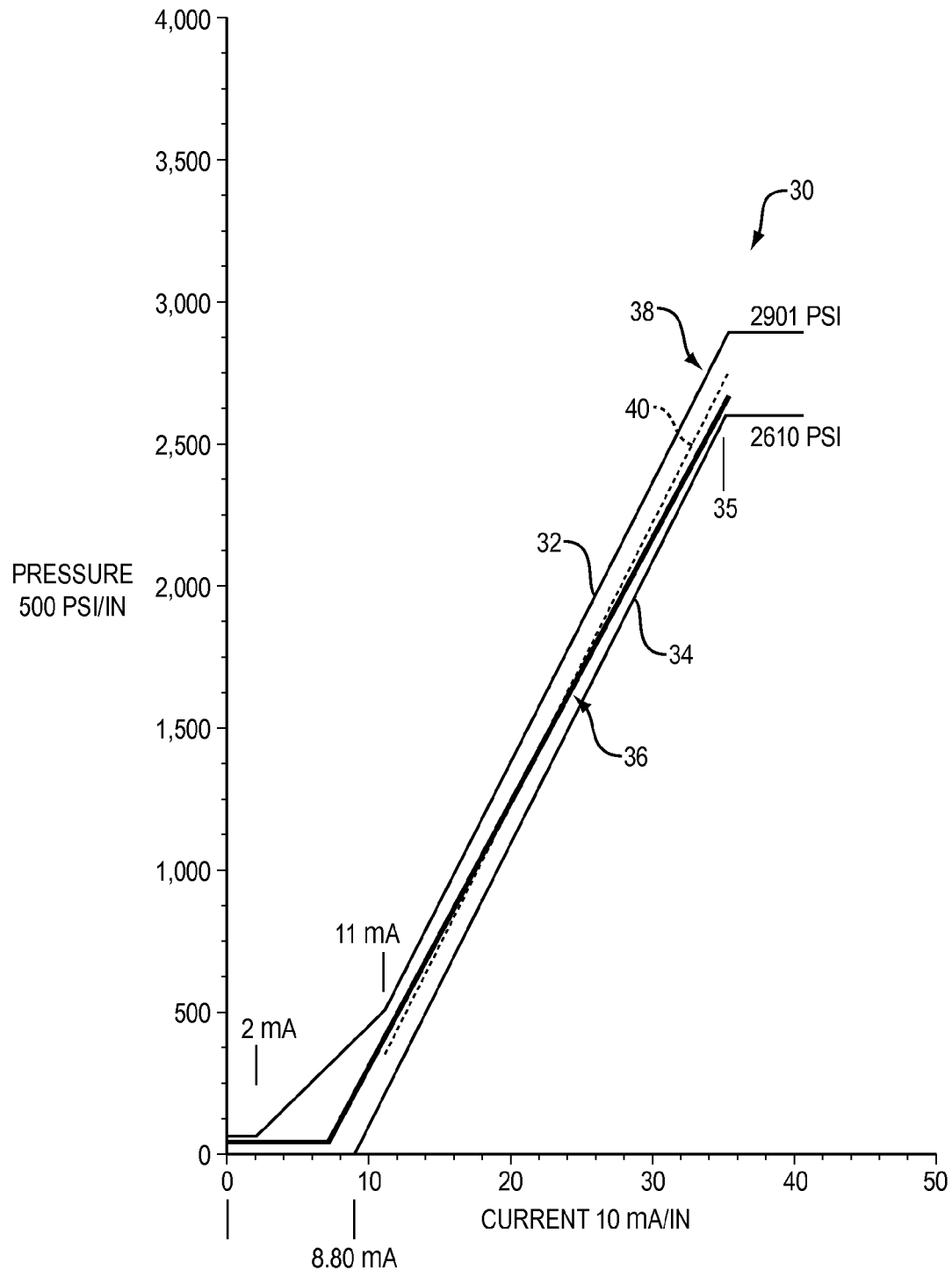
FIG. 3 illustrates a pressure-gain plot for a conventional servovalve.
Figure 8:
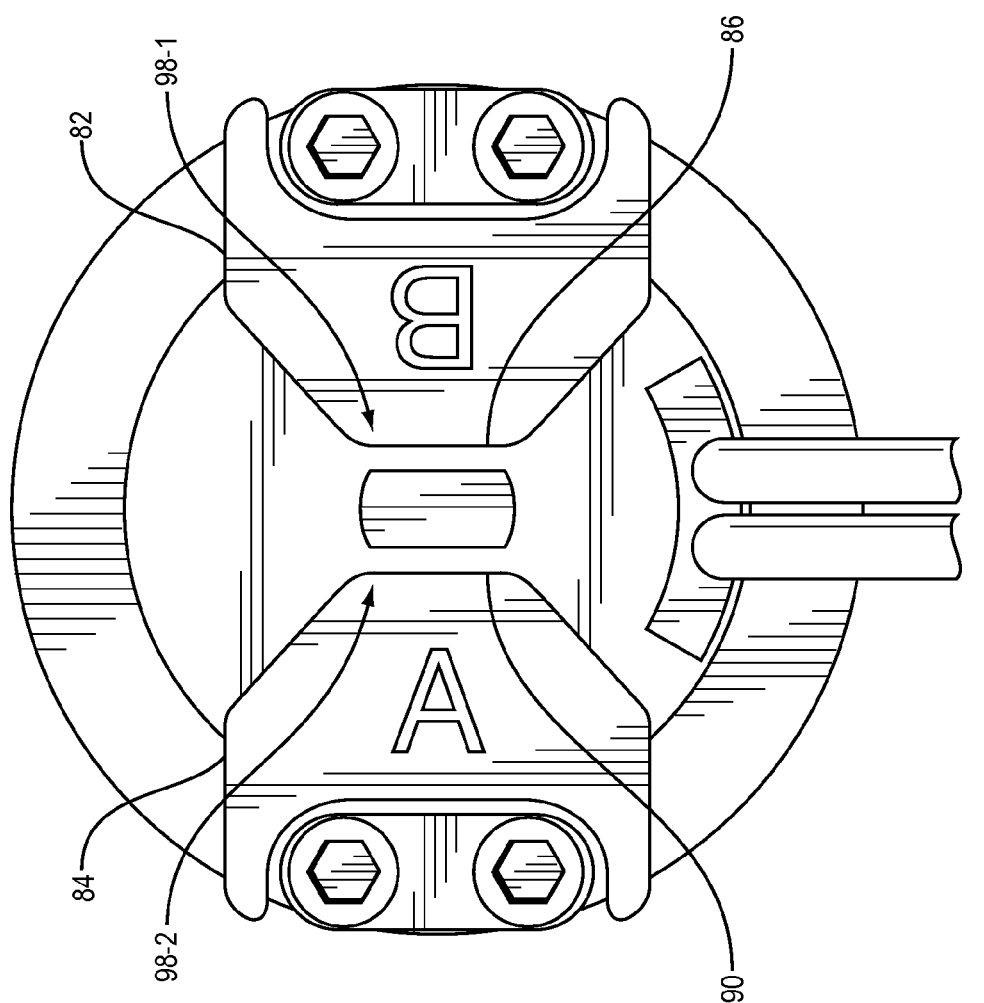
FIG. 8 is a top view of the first and second pole pieces of the torque motor of FIG. 4, according to one embodiment.

By generating a reduced bias armature flux in the armature 76 relative to the first pole piece 82, the second pole piece 84 allows the pole pieces 82, 86 to define substantially equal air gaps 98 relative to the respective armature portions 86, 90, as illustrated in FIGS. 5 and 8 (i.e., the reduced bias armature flux minimizes the tendency for an armature to lean toward a particular pole piece, as shown in FIG. 2). For example, the first pole piece 82 and the first armature portion 86 define a first air gap 98-1 such as an air gap of about 0.0146 inches and the second pole piece 84 and the second armature portion 90 define a second air gap 98-2 of about 0.015 inches. With the presence of substantially equal air gaps 98-1, 98-2 in the torque motor 56, the second reduced area pole piece 84 decreases armature saturation and improves linearity of the torque motor output in the saturation region.

Figure 9:
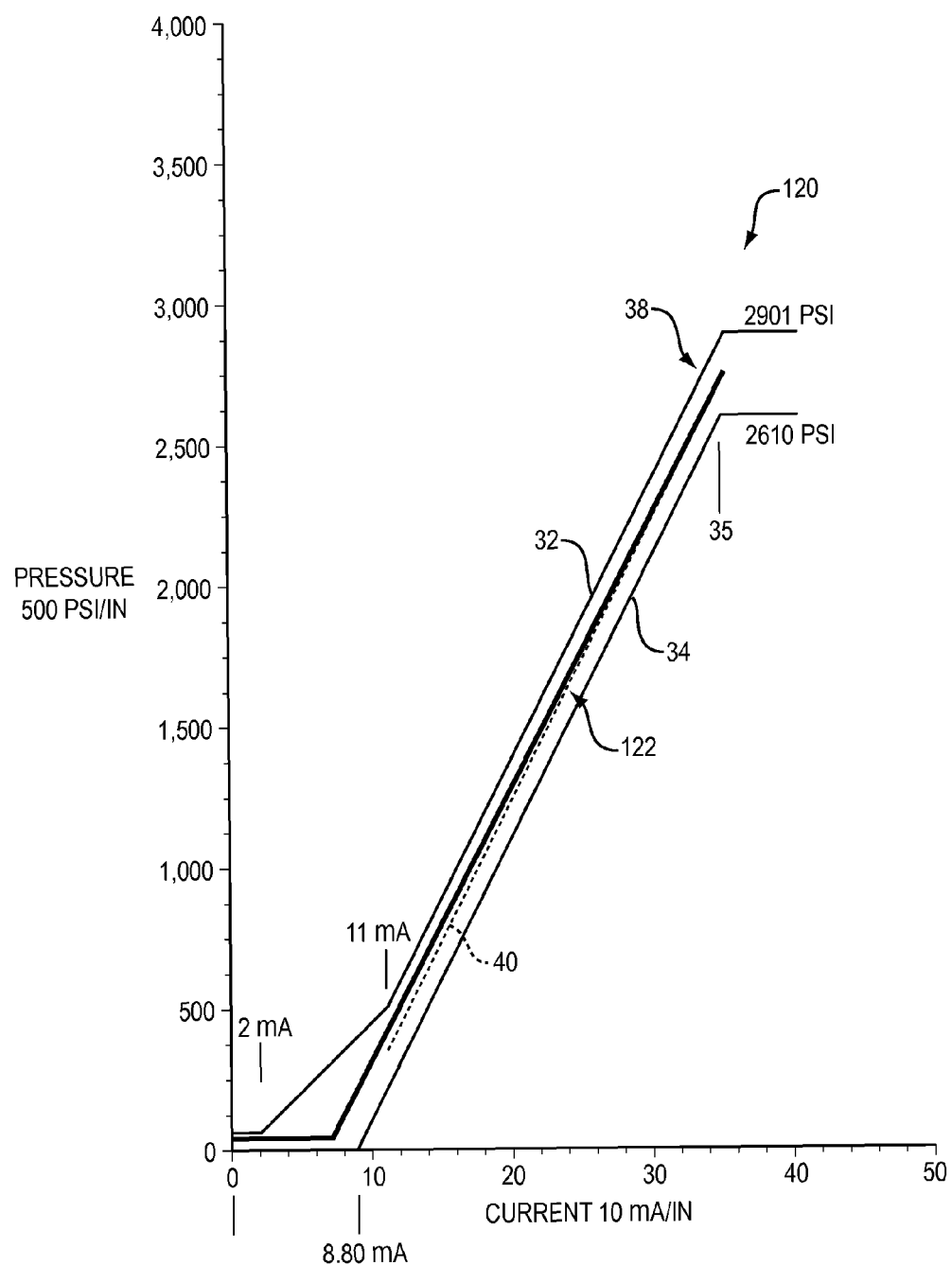
FIG. 9 is a pressure-gain plot for the servovalve of FIG. 4, according to one embodiment.

For example, FIG. 9 is a pressure-gain plot for a servovalve, such as the servovalve 50 illustrated in FIG. 4, having first and second pole pieces 82, 86 as described above. During the manufacturing process, a manufacturer calibrates the torque motor 56 by adjusting the positioning of the pole pieces 82, 84 relative to the armature 76 such that the air gaps 98-1, 98-2 are substantially equal. With such positioning, the gain of the torque motor 52 and the corresponding pressure output of the servovalve 50 falls within a range between an upper boundary 32 and a lower boundary 34, as provided by pressure-gain relationship curve 122. However, because of the difference in the pole pieces areas opposing the armature 76, in addition to the pressure-gain relationship 122 for the servovalve 50 falling within the boundaries 32, 34, the pressure-gain relationship 122 remains linear at a maximum portion 38 of the pressure-gain plot 120. At the maximum portion 38, as the armature 76 reaches a saturation level or region, the measured pressure-gain relationship 122 conforms to an expected pressure-gain relationship 40. Accordingly, during operation of the torque motor 56, application of a saturation current (e.g., between 30-35 milliamps) can result in a linear (e.g., directly proportional) pressure output by the servovalve 50.

While various embodiments of the invention have been particularly shown and described, it will be understood by those skilled in the art that various changes in form and details may be made therein without departing from the spirit and scope of the invention as defined by the appended claims.

For example, as indicated above, the torque motor 56 is utilized as the first stage of a pressure control servovalve, such as nozzle/flapper servovalve. Such description is by way of example only. In one arrangement, the torque motor 56 can be utilized as part of a jet pipe servovalve or a jet deflector servovalve.

What is claimed is:

1. A torque motor, comprising:
   a frame and magnet assembly having an armature pivotably coupled thereto;
   a coil carried by the frame, the coil disposed at least partially about the armature;
   a first pole piece carried by the frame, the first pole piece disposed in proximity to a first coil portion and the first pole piece having a first armature face that opposes a first armature portion, the first armature face defining a first pole piece area; and
   a second pole piece carried by the frame, the second pole piece opposing the first pole piece, the second pole piece disposed in proximity to a second coil portion, the second coil portion opposing the first coil portion, the second pole piece having a second armature face that opposes a second armature portion, the second armature face defining a second pole piece area, the second pole piece area being less than the first pole piece area of the first pole piece.

2. The torque motor of claim 1, wherein the second pole piece area of the second armature face is between about 40% and 50% less than the first pole piece area of the first armature face.

3. The torque motor of claim 2, wherein the second pole piece area of the second armature face is 44% less than the first pole piece area of the first armature face.

4. The torque motor of claim 1, wherein the first armature face and the first armature portion define a first air gap and the second armature face and the second armature portion define a second air gap, the first air gap being substantially equal to the second air gap.

5. The torque motor of claim 1, wherein the first pole piece area, defined by the first armature face, is configured to generate a first bias armature flux in the armature and a second pole piece area defined by the second armature face is configured to generate a second bias armature flux in the armature, the second bias armature flux being less than the first bias armature flux.

6. The torque motor of claim 5, wherein the second pole piece area defined by the second armature face is configured to generate the second bias armature flux in the armature between about 190% and 210% less than the first bias armature flux in the armature as generated by the first pole piece area defined by the first armature face.

7. The torque motor of claim 6, wherein the second pole piece area defined by the second armature face is configured to generate the second bias armature flux in the armature of about 200% less than the first bias armature flux in the armature as generated by the first pole piece area defined by the first armature face.

8. The torque motor of claim 1, wherein the first pole piece area defined by the first pole piece and the second pole piece area defined by the second pole piece are configured to generate a bias in an input current received by the torque motor.

9. A servovalve comprising:
- a housing;
- a first stage having a torque motor coupled to the housing, the torque motor comprising:
  - a frame having an armature pivotably coupled thereto,
  - a coil carried by the frame, the coil disposed at least partially about the armature,
  - a first pole piece carried by the frame, the first pole piece disposed in proximity to a first coil portion and the first pole piece having a first armature face that opposes a first armature portion, the first armature face defining a first pole piece area, and
  - a second pole piece carried by the frame, the second pole piece opposing the first pole piece, the second pole piece disposed in proximity to a second coil portion, the second coil portion opposing the first coil portion, the second pole piece having a second armature face that opposes a second armature portion, the second armature face defining a second pole piece area, the second pole piece area being less than the first pole piece area of the first pole piece; and
- a second stage having a spool disposed within an opening defined by the housing, the second stage disposed in fluid communication with the first stage.

10. The servovalve of claim 9, wherein the second pole piece area of the second armature face is between about 40% and 50% less than the first pole piece area of the first armature face.

11. The servovalve of claim 10, wherein the second pole piece area of the second armature face is 44% less than the first pole piece area of the first armature face.

12. The servovalve of claim 9, wherein the first armature face and the first armature portion define a first air gap and the second armature face and the second armature portion define a second air gap, the first air gap being substantially equal to the second air gap.

13. The servovalve of claim 9, wherein the first pole piece area, defined by the first armature face, is configured to generate a first bias armature flux in the armature and a second pole piece area defined by the second armature face is configured to generate a second bias armature flux in the armature, the second bias armature flux being less than the first bias armature flux.

14. The servovalve of claim 13, wherein the second pole piece area defined by the second armature face is configured to generate the second bias armature flux in the armature between about 190% and 210% less than the first bias armature flux in the armature as generated by the first pole piece area defined by the first armature face.

15. The servovalve of claim 14, wherein the second pole piece area defined by the second armature face is configured to generate the second bias armature flux in the armature of about 200% less than the first bias armature flux in the armature as generated by the first pole piece area defined by the first armature face.

16. The servovalve of claim 1, wherein the first pole piece area defined by the first pole piece and the second pole piece area defined by the second pole piece are configured to generate a bias in an input current received by the torque motor.

17. The servovalve of claim 1, comprising:
- a first nozzle carried by the housing and disposed in fluid communication with a pressurized fluid source;
- a second nozzle carried by the housing and disposed in fluid communication with the pressurized fluid source; and
- a flapper carried by the armature and disposed in fluid communication with the first nozzle and the second nozzle, the armature configured to move the flapper between a first position and a second position, the second position impinging one of the first nozzle and the second nozzle to control positioning of the spool within the housing.

\* \* \* \* \*